March 8, 1949.  J. E. HUNNICUTT  2,463,970
CONVEYER CHAIN
Filed Feb. 26, 1947

INVENTOR.
J. EDGAR HUNNICUTT.
BY Louis V. Lucia
ATTORNEY.

Patented Mar. 8, 1949

2,463,970

UNITED STATES PATENT OFFICE 2,463,970

CONVEYER CHAIN

Joseph Edgar Hunnicutt, West Hartford, Conn.

Application February 26, 1947, Serial No. 730,896

1 Claim. (Cl. 74—246)

This invention relates to a conveyer chain and more particularly to a chain for use on sprockets, and in conveyers wherein it is required that the chain be bent in different directions.

An object of this invention is to provide a chain for conveyers having links with spaces adapted to receive the teeth of sprockets, and pivotal connections which will permit the chain to bend in two directions.

A still further object of this invention is to provide such a chain which will bend in one direction while travelling around a sprocket wheel and also in a crosswise direction as the chain follows a support or track.

Further objects and advantages of this invention will be more clearly understood from the following description and from the accompanying drawings in which.

Figure 1:
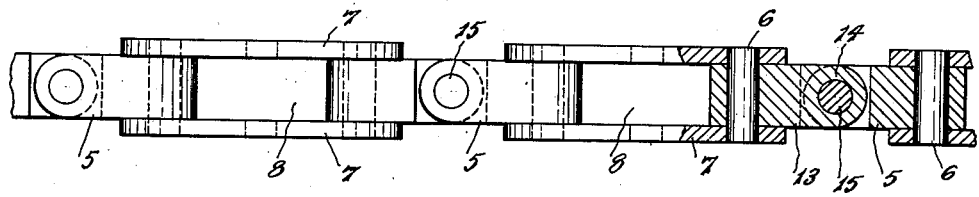
Fig. 1 is a plan view, partly in central horizontal section, of a chain embodying my invention.
Figure 2:
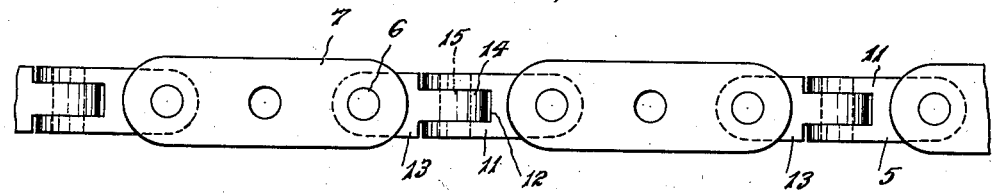
Fig. 2 is an elevational side view thereof.
Figure 3:
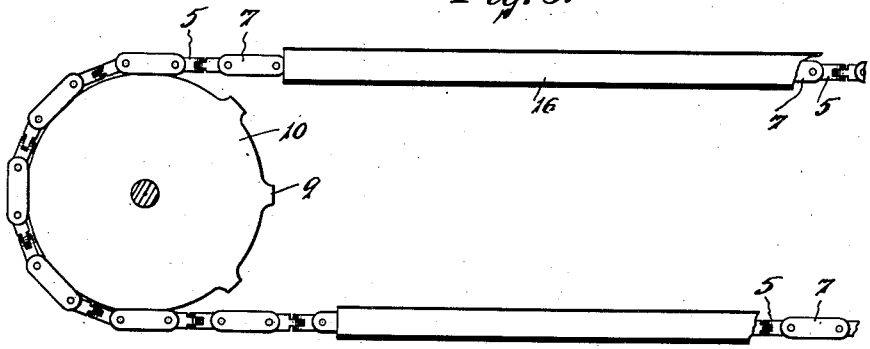
Fig. 3 is an elevational plan view of the said chain as used in connection with a sprocket wheel and a conveyer track.

As shown in the accompanying drawings, my improved conveyer chain may be constructed of a series of links 5 which are pivotally connected, by means of studs 6, to side plates 7 providing spaces 8 between the said links and side plates for receiving the teeth 9 of a sprocket, such as at 10, which drives or supports the chain.

The said links 5 are formed in two sections including a female section 11 having a notch 12 and a male section 13 having a projection 14 fitting within the said notch 12 and swivelly connected therein by means of a stud 15.

Figure 4:
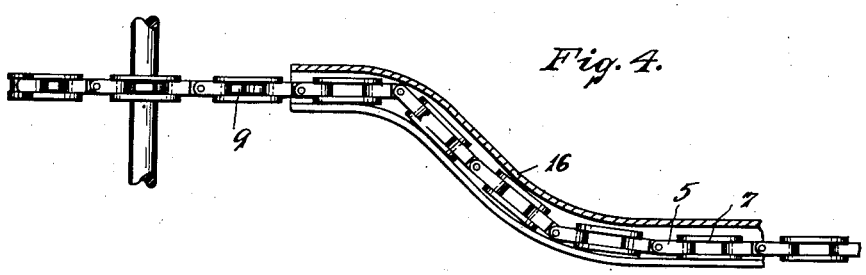
Fig. 4 is an elevational side view of said chain with a portion of the track being shown in central vertical section.

This construction permits the use of my improved chain in conveyers such as employing a guide track 16, or other suitable support for said chains, which is dipped, as shown in Fig. 4, to permit lowering and raising of articles carried by the said chain in a conveyer; this feature being of particular importance in cases where it is desired to dip the articles carried by said chain into tanks and raise them therefrom as they are carried along over the tank, as commonly done in plating rooms and the like.

From the above, it will be clearly understood that my improved chain will provide an efficient and economic construction which will permit the said chain to bend in the conventional manner, as it is carried around a wheel, and also to bend in a different direction, or perpendicular to the direction of the first bend, and thereby permit the chain to follow rises and dips in a track or support as the said chain travels therethrough.

I claim:

A chain of the character described comprising a plurality of links pivotally connected for bending in two directions; the said chain including a series of links each of which comprises a female member having a notch therein, a male member having a projection fitting within said notch, a stud extending through said female member and projection for pivotally securing the two members; each of said members having an aperture on an axis perpendicular to the axis of said stud, a separate stud extending through each of said apertures and projecting from the sides of said member, and a plate on each side of said links having an aperture therein adapted to receive the end of said separate stud; the said plates being thereby pivotally attached to said members and providing a connection between the male section of one link and the female section of the next link.

J. EDGAR HUNNICUTT.

REFERENCES CITED

The following references are of record in the file of this patent:

UNITED STATES PATENTS

| Number | Name | Date |
|---|---|---|
| 570,213 | Amborn, Jr. | Oct. 27, 1896 |
| 594,416 | McCormick | Nov. 30, 1897 |
| 911,266 | Pierson | Feb. 2, 1909 |